(12) United States Patent
Moctezuma et al.

(10) Patent No.: US 11,616,438 B2
(45) Date of Patent: Mar. 28, 2023

(54) CONTROLLED SLEW RATE CURRENT LIMITED RAMP DOWN VOLTAGE CONTROL

(71) Applicant: Texas Instruments Incorporated, Dallas, TX (US)

(72) Inventors: Ariel Dario Moctezuma, Richardson, TX (US); Gary Franklin Chard, Murphy, TX (US); Hasibur Rahman, Wylie, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 439 days.

(21) Appl. No.: 16/724,218

(22) Filed: Dec. 21, 2019

(65) Prior Publication Data

US 2021/0194362 A1 Jun. 24, 2021

(51) Int. Cl.
*H02M 3/157* (2006.01)
*H02M 3/158* (2006.01)

(52) U.S. Cl.
CPC ........... *H02M 3/157* (2013.01); *H02M 3/158* (2013.01)

(58) Field of Classification Search
CPC .... H02M 3/157; H02M 3/158; H02M 1/0025; H02M 3/1582; H02M 3/156–1588; H02M 1/0016–0029; G06F 1/26–3296

USPC ........ 323/234, 235, 240, 246, 280; 363/127, 363/128, 131, 142, 143, 173; 370/212, 370/213; 455/13.4, 571, 572, 574, 127.1, 455/127.5; 375/297

See application file for complete search history.

(56) References Cited

U.S. PATENT DOCUMENTS

| | | | |
|---|---|---|---|
| 9,397,597 B2 * | 7/2016 | Qu | H02P 8/12 |
| 9,614,506 B1 * | 4/2017 | DiRenzo | H03K 5/12 |
| 2010/0148738 A1 * | 6/2010 | Schiff | H02M 3/1584 323/282 |
| 2010/0207594 A1 * | 8/2010 | Davoudi | H02M 3/157 323/283 |
| 2017/0032755 A1 * | 2/2017 | Ko | G09G 3/3688 |
| 2017/0317583 A1 | 11/2017 | Forghani-Zadeh et al. | |

* cited by examiner

*Primary Examiner* — Elim Ortiz
(74) *Attorney, Agent, or Firm* — Frank D. Cimino (57) ABSTRACT

A power circuit includes a switch circuit, an auxiliary load circuit coupled to an output terminal, a switching control circuit to operate the switch circuit responsive to an error signal, a regulator circuit having a sense resistor, a comparator to provide the error signal, and a DAC to control a sense current of the sense resistor. A DAC control circuit provides a DAC input signal having a controlled ramp rate responsive to a decreasing setpoint signal, a load control circuit selectively enables the auxiliary load circuit responsive to the decreasing setpoint signal and responsive to the error signal to control the power circuit slew rate.

16 Claims, 9 Drawing Sheets

CONTROLLED SLEW RATE CURRENT LIMITED RAMP DOWN VOLTAGE CONTROL

BACKGROUND

Switching power supplies convert electrical input power into one or more forms of output power. DC to DC converters receive DC input power and provide one or more DC outputs. Single inductor multiple output (SIMO) converters include an input, multiple outputs, and an inductor interconnected by switches to provide multiple outputs. Some SIMO converters boost a low supply voltage to deliver a negative output rail and a positive output rail. The switching circuit can be controlled responsive to target values and feedback signaling to regulate the output voltages. The desired output amplitudes can change responsive to host system requirements. Moreover, certain applications may have dynamic response specifications that limit the time permitted to reduce the output voltage, for example, during adjustment of output voltages between different levels for fast or slow charging in USB applications. The output voltage can be ramped down by driving the coupled external or main load, but light loading conditions limit the output slew rate. An auxiliary load can be coupled to the output during ramp down to increase the slew rate, but the output slew rate remains variable.

Connecting a resistive pull down circuit as an auxiliary load to the output provides a simple circuit solution, but the resistive pull down circuit does not adjust to external load, and the slew rate remains highly variable with main load levels. The resistive pull down circuit may also require trim circuits to reduce the output current variations, since the internal resistors can vary with process. Additionally, output capacitor derating curve causes non-constant slew rate at the output through increased equivalent series resistance (ESR) at low voltages. Moreover, a resistive pull down circuit connected to an output with an output capacitor exhibits higher voltage slew rates at higher output voltage levels, and decreasing slew rates as the output voltage decreases due to exponential settling time for an R-C circuit, and may not be able to meet tight slew rate specifications. Another approach is to connect a constant current auxiliary load circuit, which provides a generally simple circuit with slightly better performance than resistive pull down circuits. However, if there is a large main load, the SIMO may not be able to keep up with the total load, unless the inductor peak current is increased and the power switches are oversized, leading to excessive circuit area. Moreover, the constant current auxiliary load circuit approach does not adjust to external load variations, and the slew rate for constant current auxiliary load circuits is highly variable due to high density capacitor voltage derating.

SUMMARY

A power circuit is described, including a switch circuit, an auxiliary load circuit, a switching control circuit, a regulator circuit having a digital to analog converter (DAC), a DAC control circuit, and a load control circuit. The switch circuit is adapted to be coupled to the inductor, an output terminal, an input terminal, and a reference terminal. The auxiliary load circuit is coupled to the output terminal. The switching control circuit has outputs configured to provide switching control signals to operate switches of the switch circuit responsive to an error signal. The regulator circuit in one example includes a sense resistor coupled between the output terminal and a sense node, as well as a comparator and the DAC. The comparator has a first input coupled to the sense node, a second input coupled to a voltage reference, and an output configured to provide the error signal. The DAC has an output coupled to the sense node to control a sense current of the sense resistor responsive to a DAC input signal. A DAC control circuit is configured to provide the DAC input signal having a controlled ramp rate responsive to a decreasing setpoint signal. The load control circuit has an output coupled to the load circuit to selectively enable the load circuit responsive to the decreasing setpoint signal and responsive to the error signal. The power circuit in one example maintains normal regulated output control of a main load and the load control circuit selectively activates the auxiliary load circuit responsive to the decreasing setpoint signal to control the power circuit slew rate.

A system includes a power source coupled to an input terminal and a reference terminal, as well as main load coupled to an output terminal, an inductor, and a power circuit. The power circuit includes a switch circuit coupled to the inductor, the output terminal, the input terminal, and the reference terminal, as well as an auxiliary load circuit coupled to the output terminal, a switching control circuit that operates switches of the switch circuit responsive to an error signal, and a regulator circuit. The regulator circuit includes a sense resistor coupled between the output terminal and a sense node, a comparator and a DAC. The comparator has a first input coupled to the sense node, a second input coupled to a voltage reference, and an output configured to provide the error signal. The DAC is coupled to the sense node to control a sense current of the sense resistor responsive to a DAC input signal, and a DAC control circuit is configured to provide the DAC input signal having a controlled ramp rate responsive to a decreasing setpoint signal. The power circuit also includes a load control circuit configured to selectively enable the auxiliary load circuit responsive to the decreasing setpoint signal and responsive to the error signal.

A method includes reducing a regulator setpoint at a controlled ramp rate responsive to receiving a decreasing target setpoint signal, generating an error signal responsive to the regulator setpoint and a sense voltage, and selectively charging an inductor and discharging the inductor to deliver power from an output terminal to a main load according the error signal. The method also includes selectively activating an auxiliary load circuit to deliver power from the output terminal to the auxiliary load responsive to the error signal until a subsequent active state of the switch circuit responsive to receiving the decreasing target setpoint signal. In one example, the further includes waiting a non-zero delay time after a state change in the error signal before selectively activating the auxiliary load.

DETAILED DESCRIPTION

In the drawings, like reference numerals refer to like elements throughout, and the various features are not necessarily drawn to scale. Also, the term "couple" or "couples" includes indirect or direct electrical or mechanical connection or combinations thereof. For example, if a first device couples to or is coupled to a second device, that connection may be through a direct electrical connection, or through an indirect electrical connection via one or more intervening devices and connections. One or more operational characteristics of various circuits, systems and/or components are hereinafter described in the context of functions which in some cases result from configuration and/or interconnection of various structures when circuitry is powered and operating.

Figure 1:
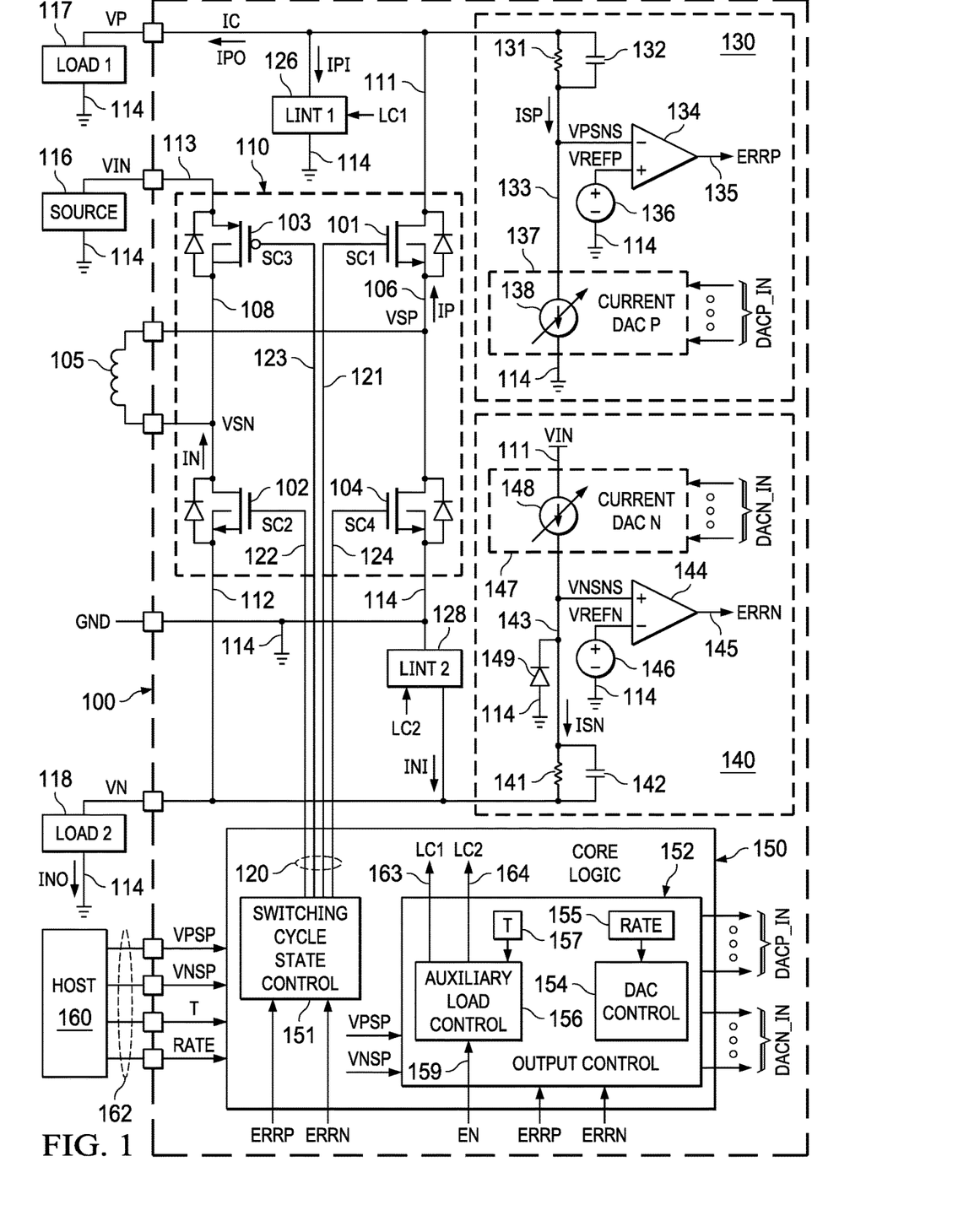
FIG. 1 is a schematic diagram of a system having a single inductor, multiple output (SIMO) power circuit having a controlled slew rate according to one aspect of this description.

FIG. 1 shows a system that includes a power circuit 100 having a controlled slew rate according to one aspect of this description. The example power circuit 100 is a single inductor, multiple output (SIMO) switching DC to DC converter circuit having a single DC input, a positive first DC output, and a negative second DC output. Described example power circuits and methods facilitate area efficient, constant slew rate output control for voltage ramp down. Other implementations can include a single output (e.g., either positive or negative), or can include more than two outputs of the same or different polarities. Any suitable switching converter topology can be used, including AC to DC switching converter types. Any type of switching converter structure can be used having one or more DC output(s), such as buck, boost, buck-boost, cuk, flyback converters, or combinations thereof. In other implementations, moreover, multiple inductors can be included. In one example, the power circuit 100 in FIG. 1 is implemented as an integrated circuit (IC) having externally accessible pins or pads (e.g., electrical terminals or nodes) that can be soldered to a host printed circuit board (PCB, not shown), and one or more external components and/or external ICs can be soldered to the PCB to form electrical circuit. For example, the inductor can be external to the power circuit IC 100 as shown in FIG. 1. In another possible implementation, the inductor can be included within the IC.

The power circuit 100 includes switches operable one powered responsive to corresponding switching control signals to a perform various power conversion functions. The illustrated example includes a first transistor 101, a second transistor 102, a third transistor 103, and a fourth transistor 104. The first, second, and fourth transistors 101, 102, and 104 in this example are n-channel field effect transistors (FETs), and the third transistor 103 is a p-channel FET. Other types of transistors or switches can be used in other implementations, such as bipolar transistors, IGBTs, SCRs, etc. The system in FIG. 1 includes a single external inductor 105, having a first terminal coupled to a first (e.g., positive) switching terminal 106. A second terminal of the inductor 105 is coupled to a second (e.g., negative) switching terminal 108. In operation, the first switching terminal 106 has a first switching terminal voltage VSP, and the second switching terminal 108 has a second switching terminal voltage VSN. The first switching terminal 106 is coupled to a source of the first transistor 101, and to a drain of the fourth transistor 104. The second switching terminal 108 is coupled to drain terminals of the second and third transistors 102 and 103. The transistors 101, 102, 103, and 104 are interconnected as shown to form a switch circuit 110. A switch circuit 110 is coupled to the terminals of the inductor 105, and to a first output terminal 111 having a first output voltage signal VP having a first polarity (e.g., positive or "+" relative to a reference voltage GND). The switch circuit 110 is also coupled to a second output terminal 112 having a second output voltage signal VN having a different second polarity (e.g., negative or "−" relative to the reference voltage GND). In addition, the switch circuit 110 is coupled to an input terminal 113 having a DC input voltage signal VIN, and to a reference terminal 114 having the reference voltage GND.

A DC power source 116 is coupled to the input terminal 113 and the reference terminal 114 to provide the DC input voltage signal VIN to the switch circuit 110 for conversion to generate one or more DC output signals. The first output terminal 111 in this example provides a positive first output voltage signal VP to a first main load 117 (e.g., labeled "LOAD 1" in FIG. 1). During operation of the power circuit 100, the first main load 117 conducts a first output current IPO. In operation, the second output terminal 112 provides a negative second output voltage signal VN to a second main load 118 (e.g., labeled "LOAD 2" in FIG. 1) that conducts a second output current INO. The main loads 117 and 118 are referred to herein as external loads, since these are external to the IC power circuit 100.

The switches 101, 102, 103, and 104 include respective control terminals 121, 122, 123, and 124 (e.g., gates) coupled to switching control outputs 120 to receive respective first, second, third, and fourth switching control signals SC1, SC2, SC3, and SC4. The switches 101, 102, 103, and 104 are configured to operate (e.g., turn on for drain-source conduction or turn off) responsive to signal states (e.g., high or low) of the respective switching control signals SC1, SC2, SC3, and SC4. The power circuit 100 in one example includes first and second auxiliary load circuits 126 and 128 (labelled "LINT 1" and "LINT 2" in FIG. 1), respectively associated with the first and second output terminals 111 and 112 to facilitate output voltage slew rate control responsive to decreasing output voltage target setpoint signals. The auxiliary load circuits 126 and 128 are formed in the integrated circuit in one example and are also referred to as internal loads.

The first auxiliary load circuit 126 has a control input configured to receive a first load control or enable signal LC1. Responsive to the signal LC1 being in a particular state (e.g., high), the first auxiliary load circuit 126 is enabled and provides additional electrical loading between the first output terminal 111 and the reference terminal 114, and the first auxiliary load circuit 126 conducts a first auxiliary load current IPI from the first output terminal 111. In operation with current flowing in the previously charged inductor 105, turning the first switch 101 on connects the first switching terminal voltage VSP to the first output terminal 111 (e.g., VP=VSP), and a positive current IP flows from the first switching terminal 106, which is equal to the sum of the first output current IPO consumed by the first main load 117 and the first auxiliary load current IPI consumed by the first auxiliary load 126 (if activated by the first load control signal LC1).

The second auxiliary load circuit 128 has a control input configured to receive a second load control or enable signal LC2. Responsive to the signal LC2 being in a particular state (e.g., high), the second auxiliary load circuit 128 is enabled and provides additional electrical loading between the second output terminal 112 and the reference terminal 114, and the second auxiliary load circuit 128 conducts a second (e.g., negative) auxiliary load current INI to the second output terminal 112. In operation with current flowing in the previously charged inductor 105, turning the second switch 102 on connects the second switching terminal voltage VSN to the second output terminal 112 (e.g., VN=VSN), and a negative current IN flows from the second output terminal 112 to the second switching terminal 108, which is equal to the sum of the second output current INO consumed by the second main load 118 and the second auxiliary load current INI consumed by the second auxiliary load 128 (if activated by the LC2 signal).

The power circuit 100 includes a first regulator circuit 130 having a first sense resistor 131 coupled in parallel with a first capacitor 132, a first sense node 133, a first comparator 134, and a first digital to analog converter (DAC) 137 (labeled "CURRENT DAC P" in FIG. 1). The first sense resistor 131 has a first terminal coupled to the first output terminal 111, and a second terminal coupled to the first sense node 133. The first comparator 134 has a first comparator input coupled to the first sense node 133, a second comparator input coupled to a first voltage reference 136 having a first reference voltage VREFP, and a comparator output 135 coupled to an error input of a switching control circuit described further below. The comparator output provides a first error signal ERRP. The first DAC 137 has a multi-bit DAC input and a DAC output coupled to the first sense node 133. The first DAC 137 includes a controlled current source 138 connected to the DAC output. The current source 138 controls a first sense current ISP of the first sense resistor 131 responsive to a first DAC input signal DACP_IN at the DAC input. The first sense current ISP generates a voltage across the first sense resistor 131 and controls a first sense voltage VPSNS of the first sense node 133. The first comparator 134 provides the error signal ERRP in a first state (e.g., high) responsive to a sense voltage VPSNS of the sense node 133 being less than a voltage VREFP of the voltage reference 136. The first comparator 134 provides the error signal ERRP in a different second state (e.g., low) responsive to the sense voltage VPSNS being greater than the voltage VREFP.

The power circuit 100 also includes a second regulator circuit 140 having a second sense resistor 141 coupled in parallel with a second capacitor 142, a second sense node 143, a second comparator 144, and a second DAC 147 (labeled "CURRENT DAC N" in FIG. 1) with a multibit second DAC input and a second DAC output coupled to the second sense node 143. The second sense resistor 141 has a first terminal coupled to the second output terminal 112, and a second terminal coupled to the second sense node 143. The second comparator 144 has a first comparator input coupled to the second sense node 143, a second comparator input coupled to a second voltage reference 146 having a second reference voltage VREFN, and a second comparator output 145 that is coupled to as second error input of the switching control circuit to provide a second error signal ERRN. The second DAC 147 includes a second controlled current source 148 that controls a second sense current ISN of the second sense resistor 141 responsive to a second DAC input signal DACN_IN at a second DAC input. The second DAC 147 has a multibit second DAC input and a second DAC output coupled to the second sense node 143. The second DAC 147 controls a second sense current ISN of the second sense resistor 141 responsive to a second DAC input signal DACN_IN. The second sense current ISN generates a voltage across the second sense resistor 141 and controls a second sense voltage VNSNS of the second sense node 143. The power circuit 100 also includes a diode 149 having an anode coupled to the reference terminal 114, and a cathode coupled to the second sense node 143.

A logic circuit 150 (labeled "CORE LOGIC" in FIG. 1) controls the power circuit 100 when powered, including steady state regulated DC to DC conversion operations, as well as current limited slew rate control during operation responsive to one or more decreasing setpoint signals. In one example, the logic circuit 150 implements a method of controlling a power circuit slew rate according to another aspect of this description, as discussed further below in connection with FIG. 2. The logic circuit 150 in one example includes programmable elements or circuits, such as memory registers, as well as a communications interface to allow programming of one or more operational characteristics of the power circuit 100, such as a configurable or programmable setpoint adjustment rate (e.g., slew rate) for each of the DC outputs, as well as a delay time parameter, as described further below. The logic circuit 150 in one example includes logic circuitry that operates responsive to program instructions, as well as memory circuits to store such instructions. In another example, the logic circuit 150 includes dedicated logic without program instructions.

The example logic circuit 150 in FIG. 1 includes a switching control circuit 151 a switching control circuit 151 that has the switching control outputs 120 coupled to the switches 101-104 of the switch circuit 110, and an error input. In the illustrated example, the logic circuit 150 has first and second inputs that respectively receive the first and second error signals ERRP and ERRN, and the switching control circuit 151 has first and second error inputs connected to the respective DAC outputs 135 and 145 to receive the first and second error signals ERRP and ERRN. The switching control circuit 151 is configured to provide switching control signals SC1, SC2, SC3, and SC4 at the respective switching control outputs 120 to operate the switches 101, 102, 103, and 104 responsive to the first and second error signals ERRP and ERRN at the respective first and second error inputs. In one example, the switching control circuit 151 implements a state machine that provides the switching control signals SC1, SC2, SC3, and SC4 in one of four states, with each of the switching control signals having one of two possible levels (e.g., high and low) to selectively turn the respective switches 101, 102, 103, and 104 on or off, as described further below in connection with FIG. 3. In one example, the switching control circuit 151 operates the switch circuit switches 101-104 responsive to the error signals ERRP and ERRN during normal operation, as well as responsive to a decreasing setpoint target for one or both of the DC outputs, in order to provide regulated power to the corresponding main load, in combination with selective activation of an associated internal or auxiliary load 126 and/or 128 as described further below, in order to implement controlled slew rate operation of the power circuit 100.

The logic circuit 150 also includes an output control circuit 152 having a DAC control circuit 154 having a setpoint input and a DAC control output coupled to the DAC inputs. The DAC control circuit 154 provides a DAC control signal (e.g., DACP_IN, DACN_IN) at the DAC control output to control the respective first and second DACs 134 and 144. The DAC control circuit 154 provides the DAC control signals DACP_IN, DACN_IN having a controlled ramp rate responsive to a decreasing setpoint signal at the setpoint input. The DAC control circuit 154 operates responsive to a programmed or programmable slew rate 155 (labeled "RATE" in FIG. 1). The logic circuit 150 also includes an auxiliary load control circuit 156 that operates responsive to a programmed or programmable delay time 157 (labeled "T"). The auxiliary load control circuit 156 in one example also has an enable input 159 configured to receive a binary enable signal EN from an external circuit (not shown) or from a host circuit 160. The logic circuit 150 includes a communications interface 162 (e.g., an I2C or other serial interface) to provide communications interconnection of the logic circuit 150 and the host circuit 160. In the example of FIG. 1, the host circuit 160 periodically provides signals or values to the logic circuit 150, such as respective first and second setpoint signals VPSP and VNSP, a time delay value 157 (T), and a programmable slew rate value (RATE). In one example, the host circuit 160 is a charging controller of a USB charging port system, and selectively sends one or more setpoint signals VPSP and VNSP whenever a change in a desired DC output voltage is desired, such as changes in charging voltages to support fast or slow charging of USB devices.

The output control circuit 152 generates the first and second DAC input signals DACP_IN and DACN_IN, for example, as single or multi-bit digital values, at least partially responsive to the respective first and second setpoint signals VPSP and VNSP. This changes the operating point of the respective current sources 138 and 148 to adjust the currents ISP and ISN of the regulators 130 and/or 140. The regulator comparators 134 and 144 compare the respective resulting sense voltage signals VPSNS and VNSNS to the reference voltages VREFP and VREFN to generate the corresponding error signals ERRP and ERRN. The load control circuit 156 also includes a first control input coupled to the first DAC output 135 and a second control input connected to the second DAC output 145. The load control circuit 156 provides the respective load control signals LC1 and LC2 responsive to the respective error signals ERRP and ERRN. The output control circuit 152 receives the error signals ERRP and ERRN, which are used by the auxiliary load control circuit 156 for selective activation of the auxiliary loads 126 and 128, respectively. The switching cycle state control circuit 151 also uses the error signals ERRP and ERRN to operate the switch circuit 110. The load control circuit 156 has a first output 163 coupled to the first auxiliary load circuit 126 to selectively provide the first load control signal LC1 to selectively enable the first auxiliary load circuit 126. The load control circuit 156 also has a second output 164 coupled to the second auxiliary load circuit 128 to selectively provide the second load control signal LC2 to selectively enable the second auxiliary load circuit 128 responsive to the decreasing setpoint signal VPSP and/or VNSP and responsive to the error signal ERRP and/or ERRN.

Figure 2:
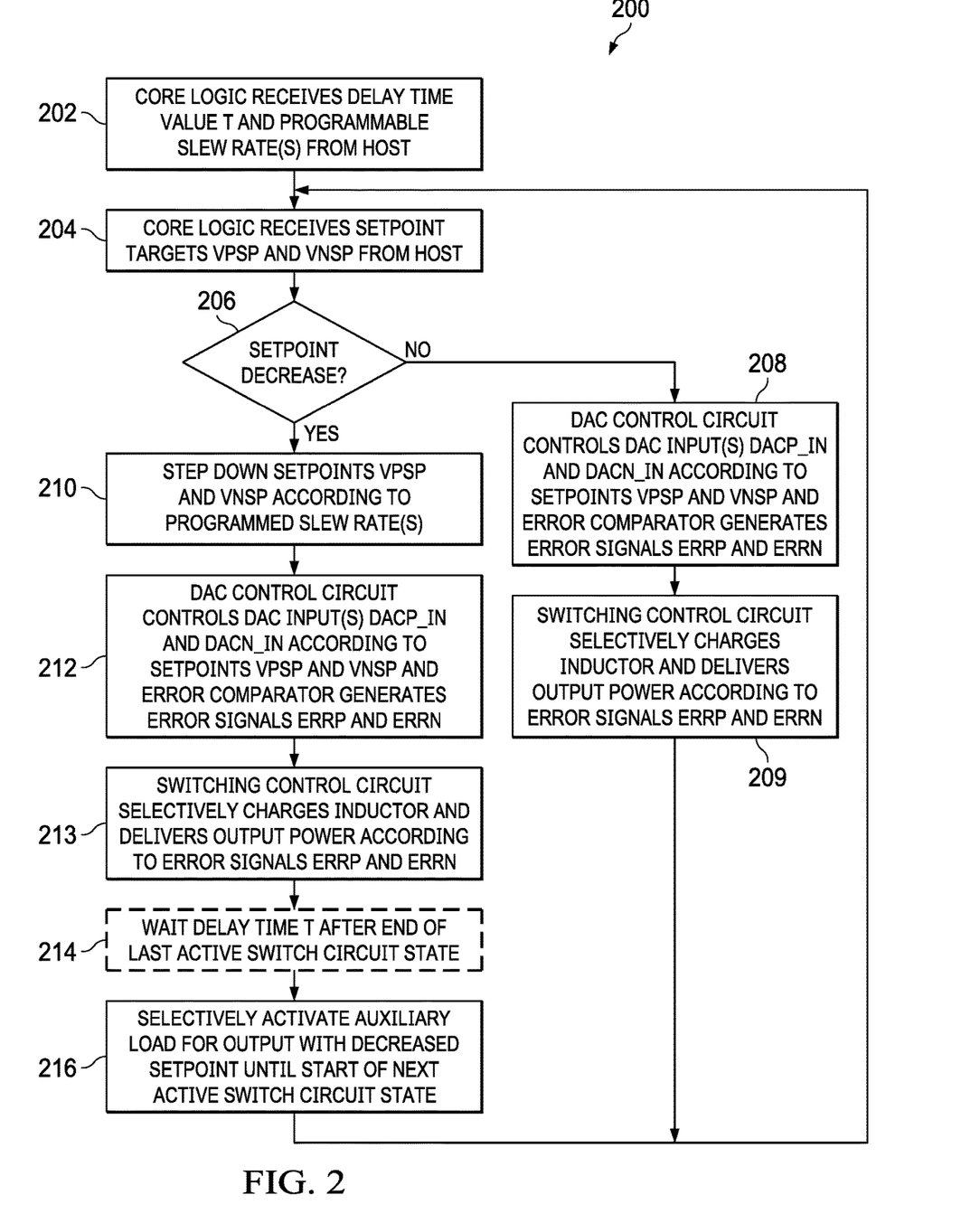
FIG. 2 is a flow diagram of a method of controlling a power circuit slew rate according to another aspect of this description.

Referring also to FIG. 2, another aspect of this description includes a method 200 of controlling a power circuit slew rate. The method 200 in one example is implemented by or using the logic circuit 150 of FIG. 1 and is described below in connection with the example power circuit 100. The method 200 begins at 202, where the logic circuit 150 receives the non-zero delay time 157 (T) and the ramp rate 155 (RAMP) from the host circuit 160. In one example, the delay time 157 and the ramp rate 155 are stored in memory registers of the logic circuit 150. At 204 in FIG. 2, the logic circuit 150 receives setpoint target signals VPSP and VNSP, for example, analog signals and/or digital values, from the host circuit 160. At 206, the logic circuit 150 determines whether either or both setpoint target signals VPSP and VNSP are decreasing compared to a respective immediately preceding setpoint target signal VPSP and/or VNSP. If not (NO at 206), the DAC control circuit 154 provides the DAC input signals DACP_IN and DACN_IN (e.g., regulator setpoints) to the respective DACs 137 and 147 at 208 responsive to the received setpoint target signals VPSP and VNSP. Also, at 208, the comparators 134 and 144 generate the respective error signals ERRP and ERRN responsive to the respective DAC input signals DACP_IN and DACN_IN and responsive to the respective sense voltages VPSNS and VNSNS. At 209, the switching control circuit 151 provides switching control signals SC1, SC2, SC3, SC4 to operate the switches 101, 102, 103, 104 to charge the inductor 105 and deliver output power responsive to the first and second error signals ERRP and ERRN, as illustrated and described further below in connection with FIGS. 3-6. The method 200 then returns to receive any new setpoint target signals VPSP and VNSP at 204 as described above.

If either or both setpoint target signals VPSP and VNSP are decreasing (YES at 206), the DAC control circuit 154 reduces the setpoints VPSP and VNSP at 210, for example, in stepwise fashion responsive to the ramp rate 155 (RATE) from the host circuit 160. This reduces the regulator setpoint DACP_IN, DACN_IN at the controlled ramp rate 155. In other examples, continuous or other non-stepwise setpoint reduction can be performed at 210. In addition, at 212, the DAC control circuit 154 provides the DAC input signals DACP_IN and DACN_IN (e.g., regulator setpoints) to the respective DACs 137 and 147 at 212 responsive to the stepped down setpoint target signals VPSP and VNSP. Also, at 212, the comparators 134 and 144 generate the respective error signals ERRP and ERRN responsive to the respective DAC input signals DACP_IN and DACN_IN and responsive to the respective sense voltages VPSNS and VNSNS. At 213, the switching control circuit 151 provides switching control signals SC1, SC2, SC3, and SC4 to operate the switches 101, 102, 103, and 104 to charge the inductor 105 and deliver output power responsive to the first and second error signals ERRP and ERRN, as illustrated and described further below in connection with FIGS. 3-6.

To control the output slew rate of the power circuit 100 responsive to receiving a decreasing target setpoint signal VPSP and VNSP, the auxiliary load control circuit 156 waits a non-zero delay time 157 at 214 after a state change in the respective error signals ERRP and ERRN before selectively activating the respective auxiliary loads 126 and 128 at 216. In another example, the delay at 214 is omitted, and the auxiliary load control circuit 156 selectively activates the respective auxiliary loads 126 and 128 at 216 responsive to a state change in the respective error signals ERRP and ERRN. The method 200 then returns to 204 as described above. At any given time, one or both target setpoints VPSP and VNSP may be decreasing, and the auxiliary load control circuit 156 in one example provides individualized selective activation of the corresponding auxiliary load circuits 126 and 128. In one example, the logic circuit 150 maintains and stores separate ramp rates 155 for each output, which can be different from one another. In one example, the logic circuit 150 implements auxiliary load control and ramp down setpoints to implement a programmable constant slew rate having four possible values (e.g., 0.5 V/msec, 1.0 V/msec, 1.5 V/msec, and 2.0 V/msec) with a slew rate error of +/−20%. In one example, the logic circuit 150 maintains separate non-zero delay times 157 for each output, which can be different from one another. The logic circuit 150 in one example implements the processing at 210-216 separately for each output for which the associated target setpoint is decreasing.

In one example, the switching control circuit 151 implements the switch cycle state machine jointly for the switch states of the shared switch circuit 110, and selectively delivers output power to the individual outputs as needed responsive to the respective error signals ERRP and ERRN. The switching control circuit 151 in one example implements idle, charging, and active power delivery states of the switch circuit 110, and the auxiliary load control circuit 156 selectively activates a given one or both of the auxiliary load circuits 126, 128 to deliver power 213 from the respective output terminal 111, 112 to the auxiliary load 126 and 128 responsive to the respective error signal ERRP and ERRN until a subsequent active state of the switch circuit 110. In one example, the switching control circuit 151 provides switching control signals SC1, SC2, SC3, and SC4 to control the switch circuit 110 at 209 and 215 in FIG. 2 to selectively charge the inductor 105 and discharge the inductor 105 to deliver power from an output terminal 111, 112 to a main load 117, 118 according the respective error signal ERRP and ERRN.

Figure 3:
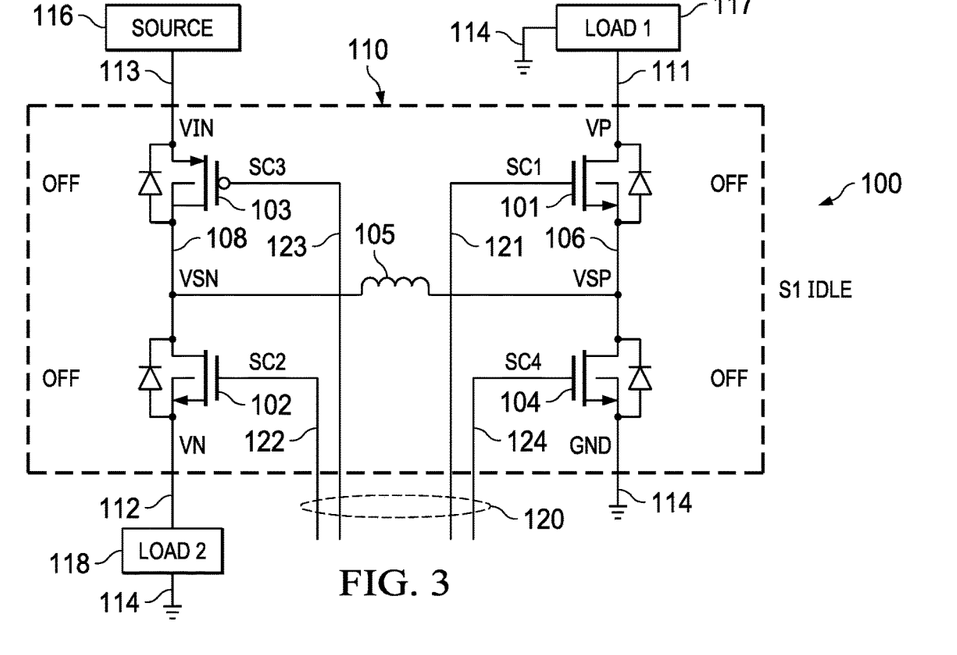
FIGS. 3-6 are schematic diagrams showing operation of a switch circuit in different switching control states.

Referring also to FIGS. 3-6, the example switching control circuit 151 has the switching control outputs 120 coupled to the switch circuit 110, and the switching control circuit 151 provides the switching control signals SC1, SC2, SC3, and SC4 to operate the switches 101, 102, 103, and 104 responsive to the first and second error signals ERRP and ERRN. In one example, the switching control circuit 151 implements a state machine that provides the switching control signals SC1, SC2, SC3, and SC4 in one of four states. FIGS. 3-6 show operation of a switch circuit in different switching control states of the state machine implemented by the example switching control circuit 151. FIG. 3 shows an example first state (labeled "51 IDLE" in FIG. 3). In the first state (e.g., IDLE) the switching control circuit 151 provides the switching control signals SC1, SC2, SC3, and SC4 to turn the switches 101, 102, 103, and 104 off to disconnect the output terminals 111 and 112 from the inductor 105 and to disconnect the inductor 105 from the respective input and reference terminals 113 and 114. In one example, the first state is configurable to be a first sub-state in which the switching control circuit 151 provides the switching control signals SC1, SC2, SC3, and SC4 to turn only the switch 103 on, or a second sub-state in which the switching control circuit 151 provides the switching control signals SC1, SC2, SC3, and SC4 to turn only the switch 104 on. In this example, the sub-states of the first (e.g., IDLE) state provide a low impedance property to the first and second switching terminals 106 (e.g., VSP) and 108 (VSN).

Figure 4:
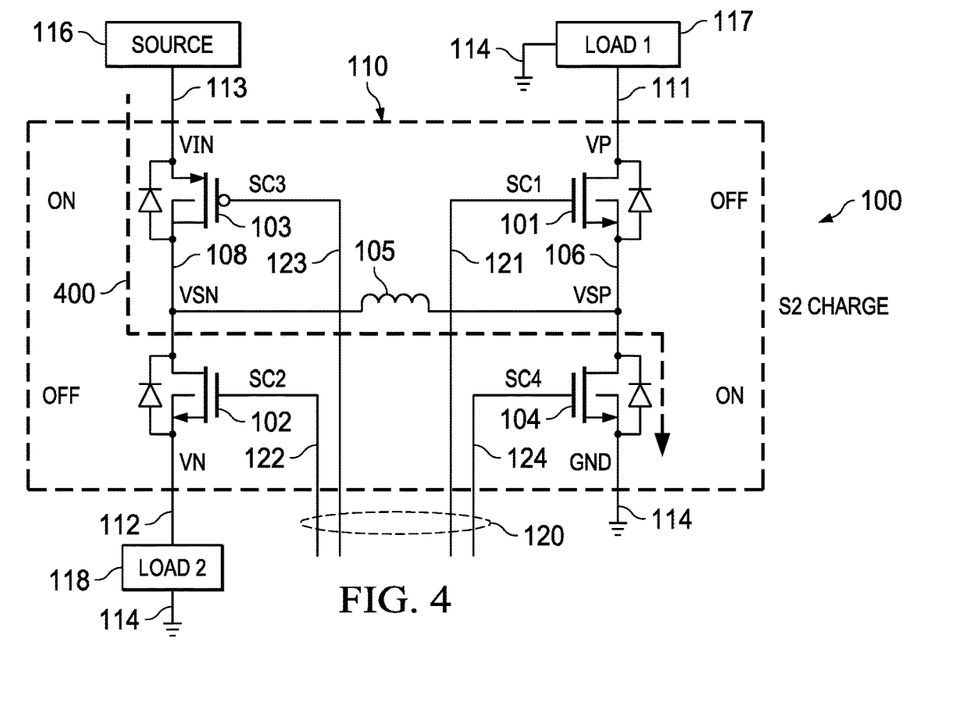

FIG. 4 shows a second state (labeled "S2 CHARGE"), in which the switching control circuit 151 provides the switching control signals SC1, SC2, SC3, and SC4 to turn the switches 101 and 102 off and to turn the switches 103 and 104 on to connect the inductor 105 between the input terminal 113 and the reference terminal 114. This provides a charging path from the source 116 through the third transistor 103, through the inductor 105, and through the fourth transistor 104 to the reference terminal 114. During this charging state, current flows along a path 400 shown in dashed line in FIG. 4 and the connection builds up current in the inductor 105.

Figure 5:
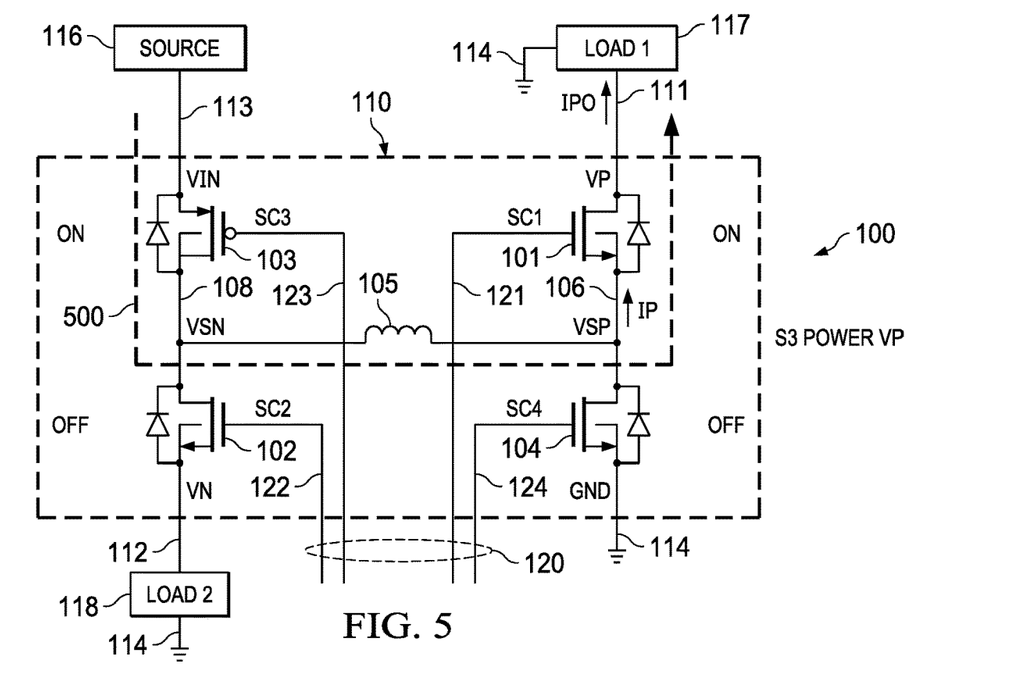
Figure 6:
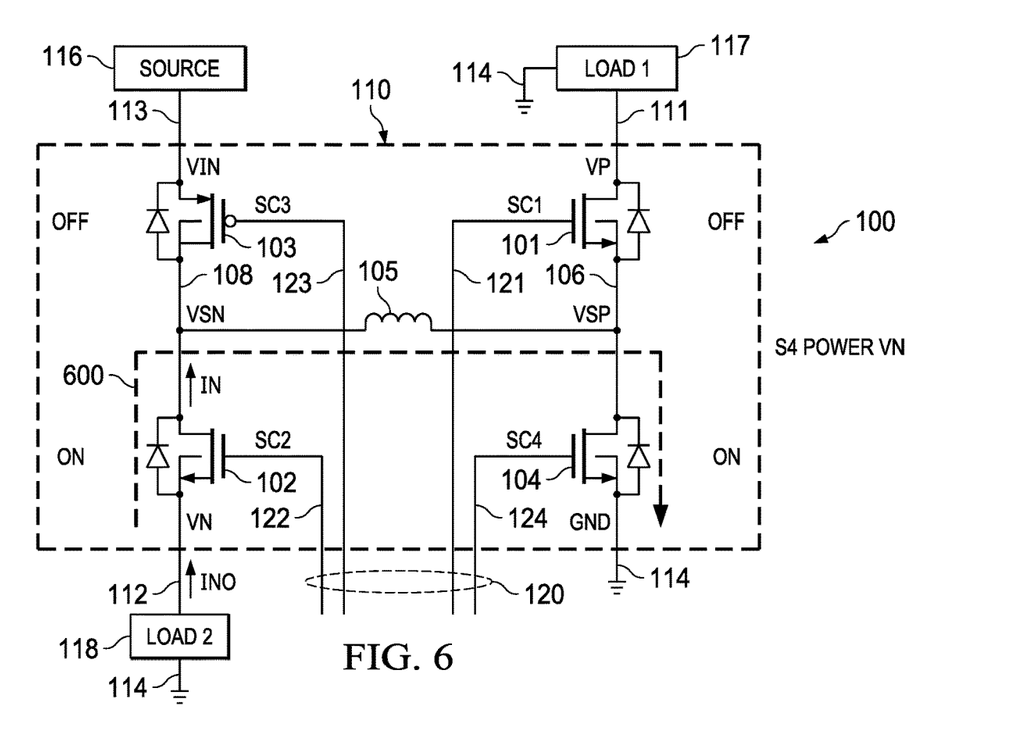

FIGS. 5 and 6 show power delivery states that are initiated by the switching control circuit 151 following an inductor charging state shown in FIG. 4. FIG. 5 shows a third state (labeled "S3 POWER VP" in FIG. 5) to connect the inductor 105 to the first output terminal 111 and to deliver power from the inductor 105 to the first output terminal 111. In this state, the switching control circuit 151 provides the switching control signals SC1, SC2, SC3, and SC4 to turn the switches 101 and 103 on and to turn the switches 102 and 104 off. The third state in FIG. 5 provides a path 500 to conduct current from the inductor 105 through the first transistor 101 to the first main load 117. FIG. 6 shows a fourth state (labeled "S4 POWER VN"), in which the switching control circuit 151 provides the switching control signals SC1, SC2, SC3, and SC4 to turn the switches 101 and 103 off, and to turn the switches 102 and 104 on. The fourth switching state in FIG. 6 provides a path 600 to conduct current from the second main load 118 through the switch 102, the inductor 105 and through the fourth switch 104 to the reference terminal 114.

The example circuit has a positive first output and a negative second output, in which the switching control circuit 151 provides the switching control signals SC1, SC2, SC3, and SC4 to operate the respective switches 101, 102, 103, and 104 of the switch circuit 110 to provide the first output voltage signal VP having a first polarity (+) at the output terminal 111 and to provide the second output voltage signal VN having an opposite second polarity (−) at the second output terminal 112. In operation where power is to be delivered to both main loads 117 and 118, the switching control circuit 151 in one example performs an inductor charging cycle using the second state shown in FIG. 4 followed by a positive power delivery state shown in FIG. 5, and thereafter performs another inductor charging cycle using the second state of FIG. 4, followed by a negative power delivery state shown in FIG. 6. In another example, a single inductor charging state (e.g., FIG. 4) is followed by a positive power delivery state of FIG. 5, after which a negative power delivery state is implemented as shown in FIG. 6 before the inductor 105 is again charged by repeating the second state of FIG. 4. These example switching circuit state control sequences are performed responsive to the needs of the individual power outputs as indicated by state transitions of the respective error signals ERRP and ERRN, both during normal operation, and in slew rate control operation responsive to one or more of the setpoints decreasing.

The load control circuit 156 in one example is configured to selectively enable the load circuit 126 responsive to the decreasing setpoint signal VPSP the non-zero delay time T after a state change in the error signal ERRP, and to selectively enable the second load circuit 128 responsive to the decreasing second setpoint signal VNSP the non-zero delay time T after a state change in the second error signal ERRN. For example, when one error signal ERRP is asserted (e.g., transitions high), the logic circuit 150 sequences the SIMO power circuit 100 by operating the switch circuit 110 in order to charge the inductor 105 and deliver energy to regulate the associated output voltage VP. With respect to the second output, when ERRN is asserted (e.g., transitions high), the logic circuit 150 sequences the SIMO power circuit 100 by operating the switch circuit 110 in order to charge the inductor 105 and deliver energy to regulate the associated negative output voltage VN. Once VN reaches its target voltage, ERRN is de-asserted (e.g., transitions low).

Figure 7:
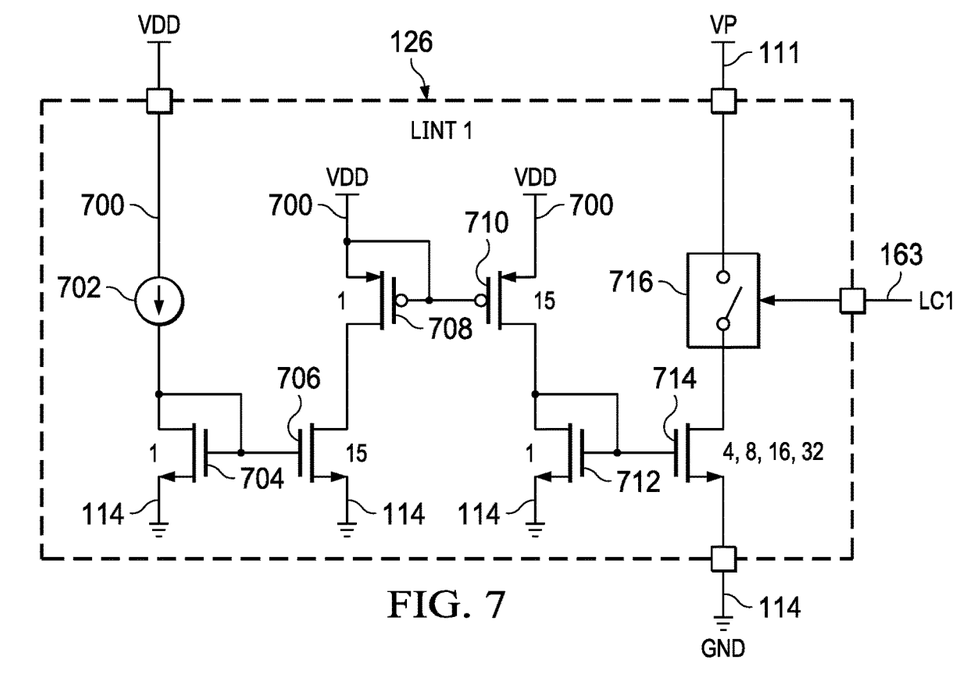
FIG. 7 is a schematic diagram of an example auxiliary load circuit according to one aspect of this description.

Referring also to FIGS. 7-10, any suitable auxiliary load circuits 126, 128 can be used to selectively provide the auxiliary loading to the respective output terminals 111 and 112 responsive to control signaling from the auxiliary load control circuit 156. FIG. 7 shows an example implementation of the auxiliary load circuit 126 to provide selectively controlled auxiliary loading to the first output terminal 111 according to an aspect of this description. In this example, the auxiliary load circuit 126 includes transistors forming a series of current mirrors to scale a reference current up to a desired drain current that can be selectively coupled to the first output terminal 111. A similar circuit can be used for the second auxiliary load 128 in the power circuit 100. The auxiliary load circuit 126 in FIG. 7 has an input node 700 that connects a supply voltage VDD to a current source 702. The current source 702 provides a reference current signal to a drain of a first mirror transistor 704 (e.g., n-channel FET). The gate and drain of the transistor 704 are coupled to a gate of a transistor 706 (e.g., n-channel FET) to form a first current mirror circuit. In one example, the transistors 706 and 704 have a size ratio of 15:1, although different ratios can be used. In this example, the current flowing through the transistor 706 is 15 times the current of the reference 702 and is the same current that flows through an upper transistor 708 (e.g., p-channel FET) coupled in series with the transistor 706 between the supply voltage VDD and the reference terminal 114. The transistor 708 forms a second current mirror circuit having a transistor 710 (e.g., p-channel FET), in which the gate and source of the transistor 708 are coupled to the gate of the transistor 710. In one example, the transistors 710 and 708 have a size ratio of 15:1, although different ratios can be used. In this example, the current flowing through the transistor 710 is 15 times the current flowing through the transistor 708 and is the same current that flows through a lower transistor 712 (e.g., n-channel FET).

The gate and drain of the transistor 712 are coupled to a gate of an output transistor 714 (e.g., n-channel FET) to form a third current mirror circuit. The size of the output transistor 714 is programmable, for example, using multiple parallel transistors having programmable or configurable interconnecting switch circuitry (not shown) to set a size ratio of the transistors 714 and 712 to be different values, such as 4, 8, 16, and 32. In one example, the size of the transistor 714 is configured responsive to a parameter received from the host circuit 160 in FIG. 1 to allow a user to adjust the amount of auxiliary loading provided by the circuit 126 when activated. The auxiliary load circuit 126 in this example also includes a switch 716 coupled in series between the drain of the transistor 714 and the first output terminal 111. The switch circuit 716 in one example is a transistor circuit. The switch circuit 716 is operated responsive to the first load control signal LC1 from the output 163 of the auxiliary load control circuit 156. The example auxiliary load circuit 126 of FIG. 7 can include any suitable number of current mirror circuit stages with any suitable transistor size ratios to achieve a desired auxiliary load current amplitude, although larger ratios between the auxiliary load current sinked from (or delivered to) the respective output terminal 111 (112), and the original reference current provided by the current source 702 increases the area of the auxiliary load circuit. Similar or equivalent current source auxiliary load circuitry 128 can be designed based on the structure of the example load circuit 126 in FIG. 7 to accommodate an auxiliary load circuit 128 that selectively sources load current to the negative output terminal 112.

Figure 8:
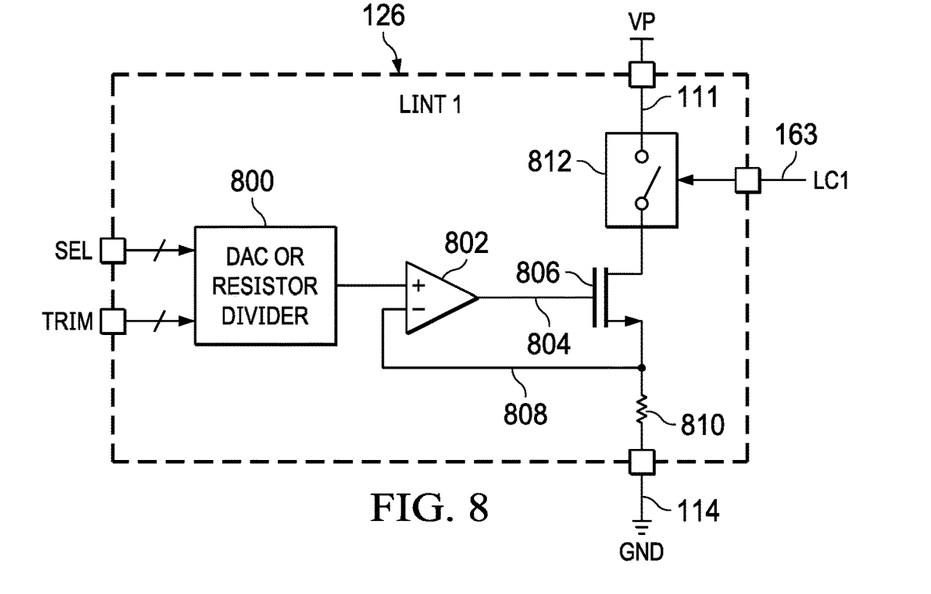
FIG. 8 is a schematic diagram of another example auxiliary load circuit according to another aspect of this description.

FIG. 8 shows an example resistive auxiliary load circuit 126 according to another aspect of this description. The circuit 126 in FIG. 8 provides an adjustable resistive load to the first output terminal 111 responsive to the first load control signal LC1 from the output 163 of the auxiliary load control circuit 156. In addition, the loading amplitude is configurable by select and trim inputs SEL and TRIM to a DAC or resistive divider circuit 800. In one example, the DAC or resistive divider circuit 800 is programmed by a single or multi-bit select input SEL. The output of the circuit 800 is coupled to provide a voltage signal to a non-inverting (+) input to an op amp 802, having an output 804 that controls a gate of a transistor 806. A source terminal of the transistor 806 is coupled to an inverting (−) input 808 of the op amp 802. The source of the transistor 806 is coupled through a loading resistor 810 to the reference terminal 114, and the drain of the transistor 806 is coupled through a switch 812 to the first output terminal 111. The switch 812 is operated responsive to the first load control signal LC1 from the output 163 of the auxiliary load control circuit 156. The DAC or resistive divider circuit 800 in one example has a single or multi-bit trim input to reduce the output current variations associated with manufacturing process variations. Similar or equivalent current source auxiliary load circuitry 128 can be designed based on the structure of the example load circuit 126 in FIG. 8 to accommodate an auxiliary load circuit 128 that selectively sources load current to the negative second output terminal 112.

Figure 9:
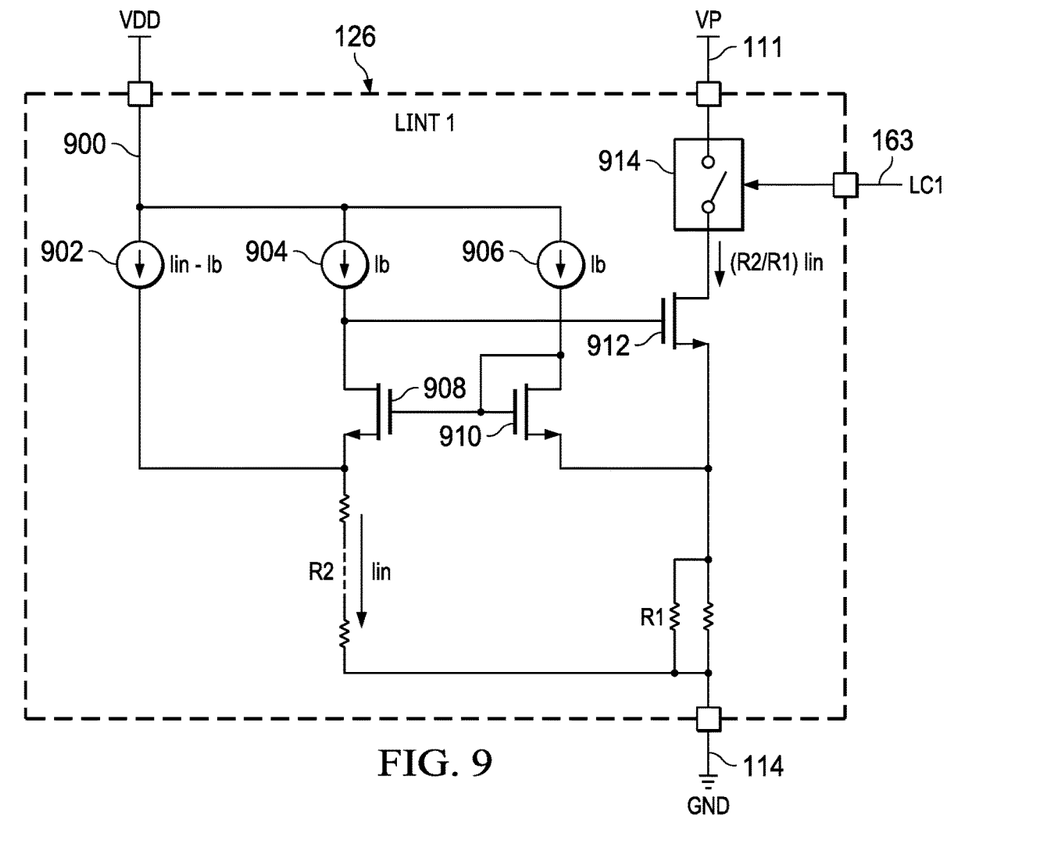
FIG. 9 is a schematic diagram of yet another example auxiliary load circuit according to another aspect of this description.

FIG. 9 shows another example of the first auxiliary load circuit 126 responsive to another aspect of this description. This example has an input node 900 that connects the supply voltage VDD to a current source 902 that conducts a current Iin−Ib. The input node is also coupled to the second and third current source is 904 and 906, respectively, each of which provides a current Ib. The lower terminals of the current sources 904 and 906 are coupled to respective drain terminals of transistors 908 and 910. The transistors 908 and 910 are coupled to form a current mirror circuit, and the drain of the transistor 908 is coupled to a gate terminal of an output transistor 912. The transistors 908, 910 912 in this example are n-channel FETs, although other transistor types can be used in different implementations. The source terminal of the transistor 908 is coupled to the lower terminal of the current source 902, and to a resistor circuit having one or more resistors having a total resistance R2 that conducts an input current Iin to the reference terminal 114 based on the contributions of the current sources 902 and 904. The circuit 126 in FIG. 9 also includes a switch 914 coupled between the first output terminal 111 and the drain of the transistor 912. The switch 914 is operated responsive to the first load control signal LC1 from the output 163 of the auxiliary load control circuit 156. The source of the output transistor 912 is coupled to the reference terminal 114 through a load resistor circuit, such as a parallel circuit illustrated in FIG. 9, having has a total resistance R1. When the switch 914 is closed, the load circuit 126 conducts (e.g., sinks) and auxiliary load current Iin*(R2/R1) from the first output terminal 111.

Figure 10:
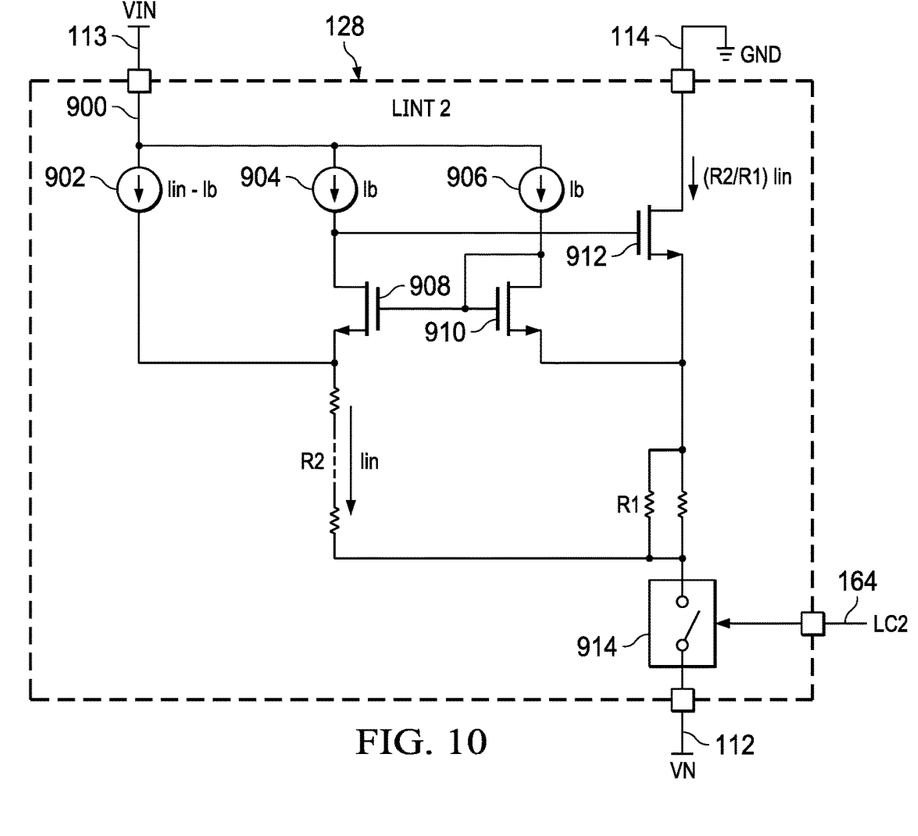
FIG. 10 is a schematic diagram of another example auxiliary load circuit according to another aspect of this description.

FIG. 10 shows an example of the second auxiliary load circuit 128, similar to the positive auxiliary load circuit 126 of FIG. 9, including the nodes and components 900, 902, 904, 906, 908, 910, 912, and 914 as previously described.

The circuit 128 in FIG. 10 has the input node 900 coupled to the input voltage signal VIN from the input terminal 113. In addition, the drain of the transistor 912 in FIG. 10 is coupled to the reference terminal 114, and the switch 914 is coupled between the lower legs of the resistor circuits and the second output terminal 112. The circuits 126 and 128 in the respective FIGS. 9 and 10 can be configured with switching circuits interconnecting multiple resistors to form the resistance R1, for example, to provide multiple configurable load current amplitudes, such as a selectable 6, 12, 18, or 24 mA current for use in combination with the above described slew rate control circuitry and techniques. Unlike the example of FIG. 8, moreover, the examples of FIGS. 9 and 10 can operate accurately without any fabrication trimming since the bias current reference Ib provided using the current sources 904 and 906 can achieve tight tolerance. In addition, the resistance values R1 and R2 can be set (e.g., and possibly adjusted or tune) to provide any desired current gain (e.g., 6 μA to 6 mA) based on ratio of resistances, which can be coupled in series on one leg and parallel on the other leg. In addition, the auxiliary load circuits of FIGS. 9 and 10 employ common gate configurations to produce high DC gain, without requiring any compensation, along with fast settling time of (e.g., less than one microsecond) following <1 μA state transition in the load control signal LC1 and LC2. In this regard, fast settling time facilitates close tracking of the decreasing target voltage during set point decreases by operating the pulldown control circuit at high frequency and allows selective use of a delay time implemented with a low count value counter circuit, as described further below in connection with FIG. 11.

Figure 11:
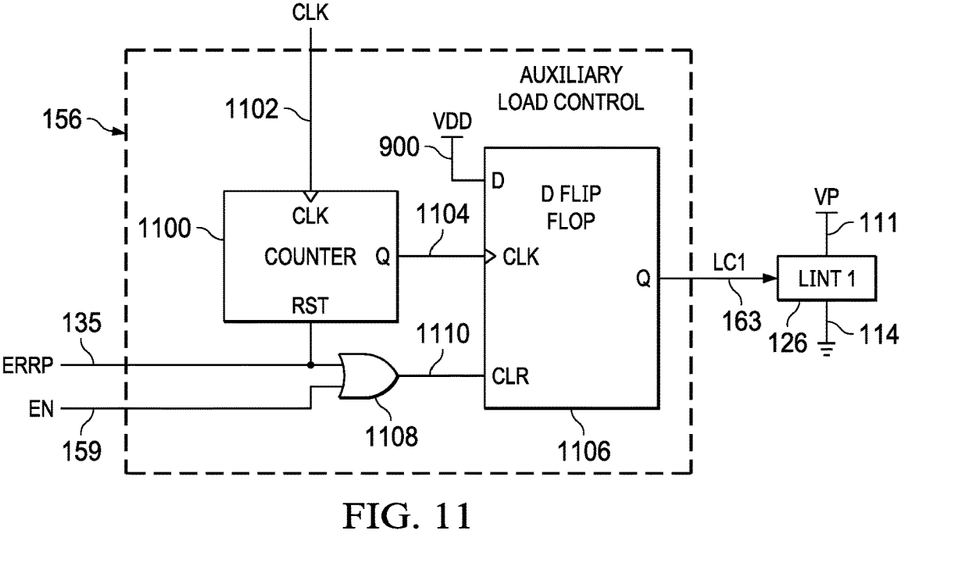
FIG. 11 is a schematic diagram of an example auxiliary load control circuit according to another aspect of this description.

FIG. 11 shows an example single channel auxiliary load control circuit 156 according to another aspect of this description. The illustrated example generates the first load control signal LC1 to selectively operate the first auxiliary load 126. A similar circuit can be used to generate the second output LC2 to selectively operate the second auxiliary load 128. The auxiliary load control circuit 156 that operates responsive to a counter that implements the non-zero delay time 157 (e.g., labeled "T" in FIG. 1). The input 159 receives the binary enable signal EN, and the circuit 156 receives the error signal ERRP from the DAC output 135. The circuit 156 includes a digital counter 1100 having a clock input 1102 configured to receive a clock signal CLK, and a reset (RST) input coupled to receive the error signal ERRP from the DAC output 135. The counter 1100 has a data output ("Q") 1104 that provides a clock input signal to a D flip-flop 1106. The data input ("D") of the flip-flop 1106 is coupled to a logic high input voltage (e.g., the supply voltage VDD) at the node 900. An OR gate 1108 has a first input coupled to receive the error signal ERRP from the DAC output 135 and a second input coupled to receive the enable signal EN. An output 1110 of the OR gate 1108 provides a clear input ("CLR"). The data output of the flip-flop 1106 ("Q") is coupled to the output 163 of the auxiliary load control circuit 156 to provide the first load control signal LC1 to operate the first auxiliary load circuit 126.

With the enable signal active (e.g., high), a state change in the error signal ERRP from the DAC output 135 resets the counter 1100 and clears the flip-flop 1106, which turns the auxiliary load 126 off. The error signal state change represents completion of an active state of the switch circuit 110 in which output power is delivered to the main load 117. Responsive to determination of the active state of the switch circuit 110, the state change in the error signal ERRP resets the counter 1100, which begins counting until a predetermined count value is reached or until the counter 1100 is again reset by a subsequent state change in the error signal ERRP. If the main load 117 is sufficient to satisfy the programmed slew rate for a decreasing target setpoint of the first output voltage VP (e.g., without assistance from the auxiliary load circuit 126), the DAC 137 causes a subsequent state change in the error signal ERRP before the predetermined count value is reached, and again resets the counter 1100.

If the main load 117 is not sufficient to provide the desired output slew rate, the counter 1100 reaches its predetermined count value and asserts the Q output. This provides a clock input signal to the flip-flop 1106 and causes the flip-flop 1106 to assert the data output as an active (e.g., high) first load control signal LC1 that activates the first auxiliary load circuit 126. During operation responsive to a decreasing target output voltage set point, the DAC control circuit 154 concurrently modifies the regulator setpoint (e.g., sense voltage VPSNS) by providing the DAC input signal (e.g., DACP_IN) to implement a controlled (e.g., stepwise) ramp down (e.g., at a selectable slew rate of 0.5 V/msec to 2 V/msec set by the host circuit 160). This operation continues for closed loop slew rate regulation until the target output voltage is reached or is again changed by the host circuit 160. In this manner, the auxiliary load control circuit 156 response to receiving a decreasing target setpoint signal by selectively activating the auxiliary load circuit (e.g., 126) to deliver power from the corresponding output terminal (e.g., 111) to the auxiliary load circuit (126) responsive to the error signal (ERRP) until a subsequent active state of the switch circuit. The slew rate control provides closed-loop regulation independent of main loading level and output terminal capacitance, using the main load 117 alone, or selective additional loading provided by the auxiliary load circuit 126 to drain the output capacitance and lower the output voltage VP at the predetermined controlled slew rate. The auxiliary load control circuit 156 in one example includes similar circuitry for the second or any additional outputs (e.g., the second output terminal 112 in FIG. 1), which provide separately regulated output voltage slew rates for decreasing target set point values.

Figure 12:
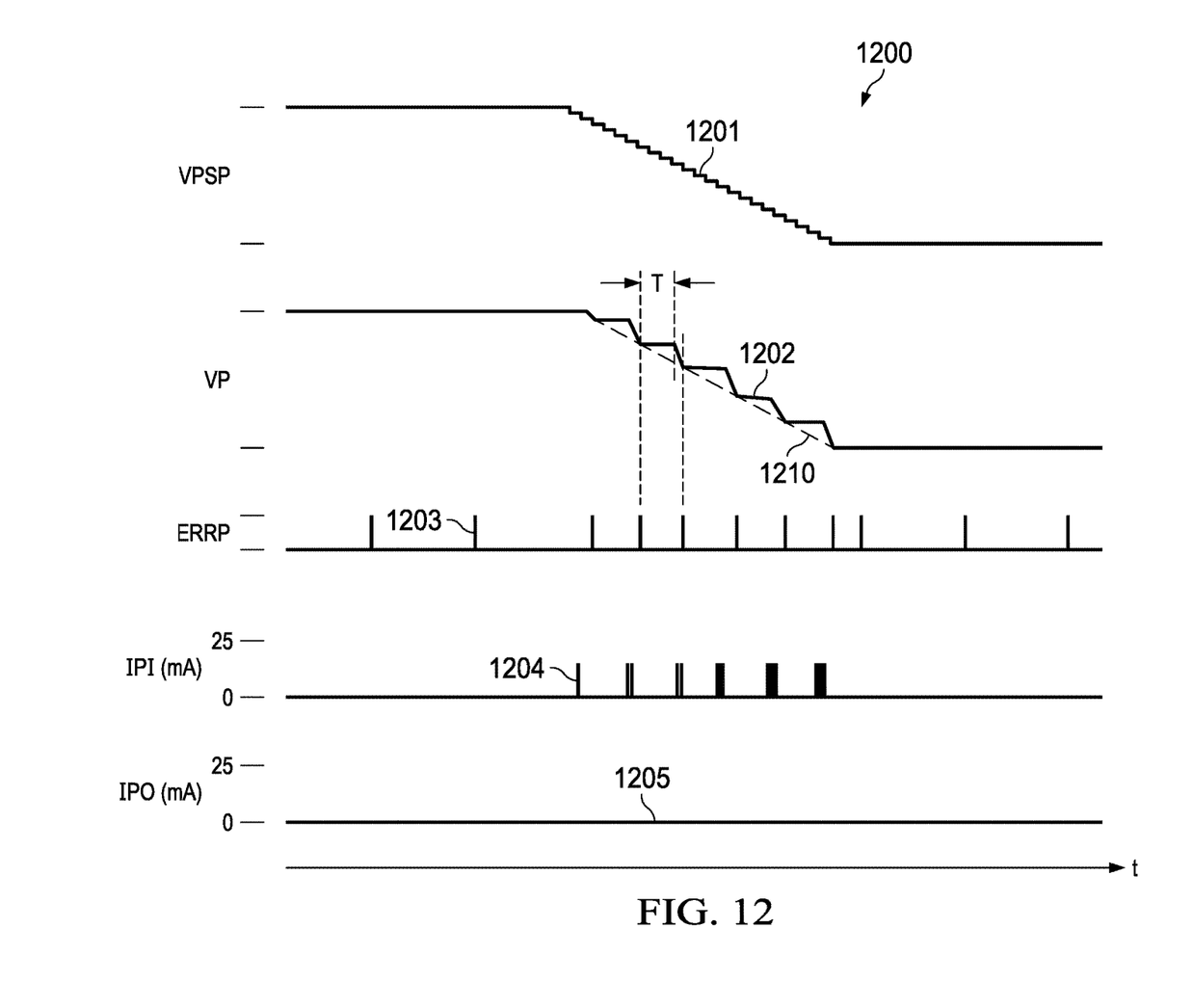
FIG. 12 is a signal diagram of example power circuit signals showing controlled slew rate operation for a positive output voltage with no external loading according to one aspect of this description.
Figure 13:
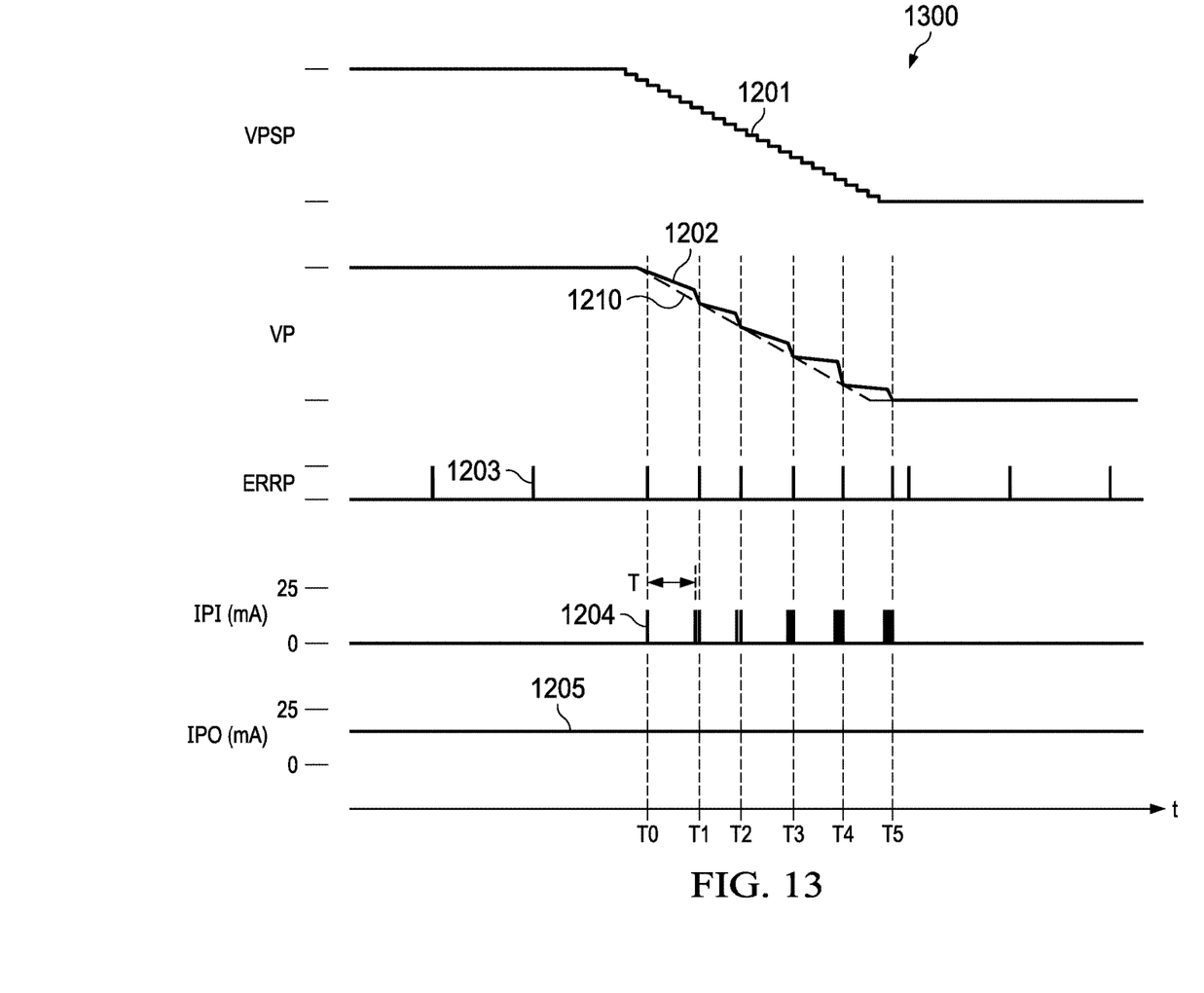
FIG. 13 is a signal diagram of example power circuit signals showing controlled slew rate operation for a positive output voltage with external loading according to one aspect of this description.

Referring also to FIGS. 12 and 13, FIG. 12 shows example power circuit signals that illustrate controlled slew rate operation for the first (e.g., positive) output voltage VP with no external (e.g., main) loading 117 using dynamic selective auxiliary loading of 15 mA by the auxiliary load circuit 126. FIG. 13 shows example power circuit signals that illustrate controlled slew rate operation for the first output voltage with external main loading of 15 mA by the first main load 117, and selective auxiliary loading of 15 mA by the auxiliary load circuit 126. A graph 1200 in FIG. 12 includes a curve 1201 that shows the first setpoint signal VPSP generated in stepwise decreasing fashion by the logic circuit 150 as a function of time responsive to a step change at time T0 decrease in the target output voltage value provided by the host circuit 160 in FIG. 1. A curve 1202 shows the first output voltage signal VP delivered at the first output terminal 111. A curve 1203 shows the first error signal ERRP, a curve 1204 shows the first auxiliary load current IPI from the first output terminal 111, and a curve 1205 shows the main load output current IPO. In addition, the graph 1200 shows a dashed line curve 1210 that represents the desired target slew rate for the output voltage decrease. FIG. 13 shows the corresponding curves 1201, 1202, 1203, 1204, 1205 and 1210 for the externally loaded situation.

As seen in FIGS. 12 and 13, the commanded output voltage decrease begins at time T0, and the spikes in the curves 1204 show the activation of the auxiliary load circuit 126 at selective times responsive to the corresponding state changes in the first error signal ERRP, which are completed at the times T1, T2, T3, T4, and T5 when the reverse state change in the first error signal ERRP indicates that the output voltage signal VP corresponds to the ramped down setpoint signal VPSP. This example also shows the non-zero wait time T implemented by the counter 1100 of the example auxiliary load control circuit 156 shown in FIG. 11. The example slew rate control circuitry and techniques use the regulator circuit DACs 137 and 147 to slowly change the output target voltage with the power circuit 100 actively operated in a closed regulation loop to control the output voltage signals VP and VN. As shown in the illustrated examples, if the total load provided by the main and auxiliary loads (e.g., 117 and 126) pulls the output voltage down fast enough to decrease the output voltage at a slew rate larger than the programmed slew rate, the power circuit 100 delivers output power to the main load. This causes the output slew rate to remain constant at the programmed value. In the case of a light main load 117, the pulldown provided by the auxiliary load 126 will engage only as needed to keep the output voltage slew rate in regulation with the programmed slew rate (e.g., controlled by the wait time T). In the case of a medium or heavy output load, the pulldown by the auxiliary load 126 is not activated if the duration between charging cycles is short enough to keep the downward slew rate at the desired value, in which case all the supplied energy is transferred to the main load 117 without loss, thereby enhancing circuit efficiency. The described examples provide low-cost mixed-signal apparatus and techniques to precisely control the slew rate of the output voltage when ramping down, with intelligent voltage ramped down.

Modifications are possible in the described examples, and other implementations are possible, within the scope of the claims.

What is claimed is:

1. A power circuit, comprising:
   a switch circuit having first and second switching terminals, an output terminal, an input terminal, and a reference terminal, the switch circuit including first and second switches;
   a load circuit coupled to the output terminal;
   a switching control circuit having first and second switching control outputs and an error input, the first and second switching control outputs respectively coupled to the first and second switches, and the switching control circuit configured to provide first and second switching control signals respectively at the first and second switching control outputs responsive to the error input;
   a regulator circuit, including:
      a comparator having a sense input, a voltage reference input, and a comparator output coupled to the error input;
      a sense resistor coupled between the output terminal and the sense input; and
      a digital to analog converter (DAC) having a DAC input and a DAC output, the DAC output coupled to the sense input;
   a DAC control circuit having a setpoint input and a DAC control output, the DAC control output coupled to the DAC input, in which the DAC control circuit is configured to provide a DAC control signal at the DAC control output, and the DAC control signal has a controlled ramp rate responsive to a decreasing setpoint signal at the setpoint input; and
   a load control circuit having an enable output coupled to the load circuit, a control input coupled to the comparator output, and the setpoint input, the load control circuit configured to control the enable output responsive to the control input and to the decreasing setpoint signal at the setpoint input.

2. The power circuit of claim 1, wherein the setpoint input is a first setpoint input, the setpoint signal is a first setpoint signal, the output terminal is a first output terminal, the error input includes first and second error inputs, the comparator is a first comparator, the comparator output is a first comparator output and is coupled to the first error input, and the power circuit further comprises:
   a second load circuit coupled to a second output terminal; and
   a second regulator circuit, including:
      a second comparator having a second sense input, a second voltage reference input, and a second comparator output coupled to the second error input;
      a second sense resistor coupled between the second output terminal and the second sense input; and
      a second DAC having a second DAC input and a second DAC output, the second DAC output coupled to the second sense input;
   in which the switching control circuit is configured to provide: the first switching control signal at the first switching control output responsive to the first error input; and the second switching control signal at the second switching control output responsive to the second error input;
   the DAC control circuit has a second setpoint input and a second DAC control output, the second DAC control output coupled to the second DAC input, in which the DAC control circuit is configured to provide a second DAC control signal at the second DAC control output, and the second DAC control signal has the controlled ramp rate responsive to a decreasing second setpoint signal at the second setpoint input; and
   the load control circuit has a second enable output coupled to the second load circuit, a second control input coupled to the second comparator output, and the second setpoint input, the load control circuit configured to control the second enable output responsive to the second control input and to the decreasing second setpoint signal at the second setpoint input.

3. The power circuit of claim 2, wherein the switching control circuit is configured to provide the first and second switching control signals to operate the first and second switches to provide a first output voltage signal having a first polarity at the first output terminal and to provide a second output voltage signal having an opposite second polarity at the second output terminal.

4. The power circuit of claim 2, wherein the load control circuit is configured to control the enable output responsive to the control input and to the decreasing first setpoint signal at the first setpoint input a non-zero delay time after a state change in a first error signal at the first error input, and to control the second enable output responsive to the second control input and to the decreasing second setpoint signal at the second setpoint input the non-zero delay time after a state change in a second error signal at the second error input.

5. The power circuit of claim 1, wherein the comparator is configured to control the comparator output to provide an error signal to the error input in a first state responsive to a sense voltage at the sense input being less than a voltage at the voltage reference input, and in a different second state responsive to the sense voltage at the sense input being greater than the voltage at the voltage reference input.

6. The power circuit of claim 5, wherein:
the switching control circuit is configured to provide the first and second switching control signals to operate the first and second switches in one of the first state, the second state or a third state, in which the first state disconnects one of the first or second switching terminals from the output terminal, the second state connects the input terminal to the second switching terminal and connects the reference terminal to the first switching terminal, and the third state reconnects the output terminal to the disconnected one of the first or second switching terminals; and
the switching control circuit is configured to provide the first and second switching control signals in the second state to build up current between the first and second switching terminals and then in the third state to deliver power to the output terminal from the first and second switching terminals.

7. The power circuit of claim 5, wherein the load control circuit is configured to control the enable output responsive to the control input and to the decreasing setpoint signal at the setpoint input a non-zero delay time after a state change in an error signal at the error input.

8. The power circuit of claim 1, wherein the load control circuit is configured to control the enable output responsive to the control input and to the decreasing setpoint signal at the setpoint input a non-zero delay time after a state change in an error signal at the error input.

9. The power circuit of claim 8, wherein the non-zero delay time is programmable.

10. The power circuit of claim 1, wherein:
the switching control circuit is configured to provide the first and second switching control signals to operate the first and second switches in one of a first state, a second state or a third state, in which the first state disconnects one of the first or second switching terminals from the output terminal, the second state connects the input terminal to the second switching terminal and connects the reference terminal to the first switching terminal, and the third state reconnects the output terminal to the disconnected one of the first or second switching terminals; and
the switching control circuit is configured to provide the first and second switching control signals in the second state to build up current between the first and second switching terminals and then in the third state to deliver power to the output terminal from the first and second switching terminals.

11. A system, comprising:
a power source coupled between an input terminal and a reference terminal;
a load coupled to an output terminal;
an inductor; and
a power circuit, comprising:
a switch circuit coupled to the inductor, the output terminal, the input terminal, and the reference terminal, the switch circuit including first and second switches;
a load circuit coupled to the output terminal;
a switching control circuit having first and second switching control outputs and an error input, the first and second switching control outputs respectively coupled to the first and second switches, and the switching control circuit configured to provide first and second switching control signals respectively at the first and second switching control outputs responsive to the error input;
a regulator circuit, including:
a comparator having a sense input, a voltage reference input, and a comparator output coupled to the error input;
a sense resistor coupled between the output terminal and the sense input; and
a digital to analog converter (DAC) having a DAC input and a DAC output, the DAC output coupled to the sense input;
a DAC control circuit having a setpoint input and a DAC control output, the DAC control output coupled to the DAC input, in which the DAC control circuit is configured to provide a DAC control signal at the DAC control output, and the DAC control signal has a controlled ramp rate responsive to a decreasing setpoint signal at the setpoint input; and
a load control circuit having an enable output coupled to the load circuit, a control input coupled to the comparator output, and the setpoint input, the load control circuit configured to control the enable output responsive to the control input and to the decreasing setpoint signal at the setpoint input.

12. The system of claim 11, wherein the setpoint input is a first setpoint input, the setpoint signal is a first setpoint signal, the output terminal is a first output terminal, the error input includes first and second error inputs, the comparator is a first comparator, the comparator output is a first comparator output and is coupled to the first error input, the system further comprises a second load coupled to a second output terminal, and the power circuit further comprises:
a second load circuit coupled to the second output terminal, and
a second regulator circuit, including:
a second comparator having a second sense input, a second voltage reference input, and a second comparator output coupled to the second error input;
a second sense resistor coupled between the second output terminal and the second sense input; and
a second DAC having a second DAC input and a second DAC output, the second DAC output coupled to the second sense input;
in which the switching control circuit is configured to provide: the first switching control signal at the first switching control output responsive to the first error input; and the second switching control signal at the second switching control output responsive to the second error input;
the DAC control circuit has a second setpoint input and a second DAC control output, the second DAC control output coupled to the second DAC input, in which the DAC control circuit is configured to provide a second DAC control signal at the second DAC control output, and the second DAC control signal has the controlled ramp rate responsive to a decreasing second setpoint signal at the second setpoint input; and
the load control circuit has a second enable output coupled to the second load circuit, a second control input coupled to the second comparator output, and the second setpoint input, the load control circuit configured to control the second enable output responsive to the second control input and to the decreasing second setpoint signal at the second setpoint input.

13. The system of claim 12, wherein:
the load control circuit is configured to control the enable output responsive to the control input and to the decreasing first setpoint signal at the first setpoint input a non-zero delay time after a state change in a first error signal at the first error input, and to control the second enable output responsive to the second control input and to the decreasing second setpoint signal at the second setpoint input the non-zero delay time after a state change in a second error signal at the second error input; and the system further comprises a host circuit coupled to the load control circuit and configured to program the non-zero delay time.

14. The system of claim 11, wherein the comparator is configured to control the comparator output to provide an error signal to the error input in a first state responsive to a sense voltage at the sense input being less than a voltage at the voltage reference input, and in a different second state responsive to the sense voltage at the sense input being greater than the voltage at the voltage reference input.

15. The system of claim 14, wherein:

the switching control circuit is configured to provide the first and second switching control signals to operate the first and second switches in one of the first state, the second state or a third state, in which the first state disconnects the output terminal from the inductor, the second state connects the inductor between the input terminal and the reference terminal, and the third state connects the output terminal to the inductor; and the switching control circuit is configured to provide the first and second switching control signals in the second state to build up current in the inductor and then in the third state to deliver power from the inductor to the output terminal.

16. The system of claim 14, wherein the load control circuit is configured to control the enable output responsive to the control input and to the decreasing setpoint signal at the setpoint input a non-zero delay time after a state change in an error signal at the error input.

* * * * *